Oct. 21, 1930.  F. H. CATHCART  1,779,032

INTERNAL COMBUSTION ENGINE

Original Filed Nov. 12, 1924   5 Sheets-Sheet 1

Oct. 21, 1930. F. H. CATHCART 1,779,032
INTERNAL COMBUSTION ENGINE
Original Filed Nov. 12, 1924  5 Sheets-Sheet 2

Inventor:
Frank H. Cathcart,
By Byrnes Townsend & Brickenstein,
Attorneys.

Oct. 21, 1930. F. H. CATHCART 1,779,032
INTERNAL COMBUSTION ENGINE
Original Filed Nov. 12, 1924 5 Sheets-Sheet 3

Oct. 21, 1930.  F. H. CATHCART  1,779,032
INTERNAL COMBUSTION ENGINE
Original Filed Nov. 12, 1924   5 Sheets-Sheet 5

Patented Oct. 21, 1930

1,779,032

UNITED STATES PATENT OFFICE

FRANK H. CATHCART, OF ALEXANDRIA, VIRGINIA, ASSIGNOR TO THE CATHCART-CUSHMAN ROTARY MOTOR INCORPORATED, OF WASHINGTON, DISTRICT OF COLUMBIA, A CORPORATION OF DELAWARE

INTERNAL-COMBUSTION ENGINE

Application filed November 12, 1924, Serial No. 749,501. Renewed September 28, 1929.

My invention relates to rotary engines of the type in which a plurality of cylinders are caused to bodily rotate as a unit about an axis parallel to the movement of the pistons by the action of the pistons upon a plate or disk disposed in a plane forming an angle other than a right angle with the axis of rotation of the cylinders.

The broad principle of operation on which the invention is based is well known and many attempts have been made to practically apply it.

My invention has as its principal object to produce a practical rotary engine which is simple in construction and efficient in operation.

The most characteristic feature of my invention, briefly stated, is the entire absence of a connection positively interconnecting the cylinders and the disk for interdependent rotary motion.

The more specific objects of the invention will appear more clearly from the description in connection with the accompanying drawings in which.

At the very outset it may be understood that, although the motor unit as shown and described is an internal combustion engine, the invention is of more general application in the sense that the motive power may be derived from any pressure fluid.

Figure 1:
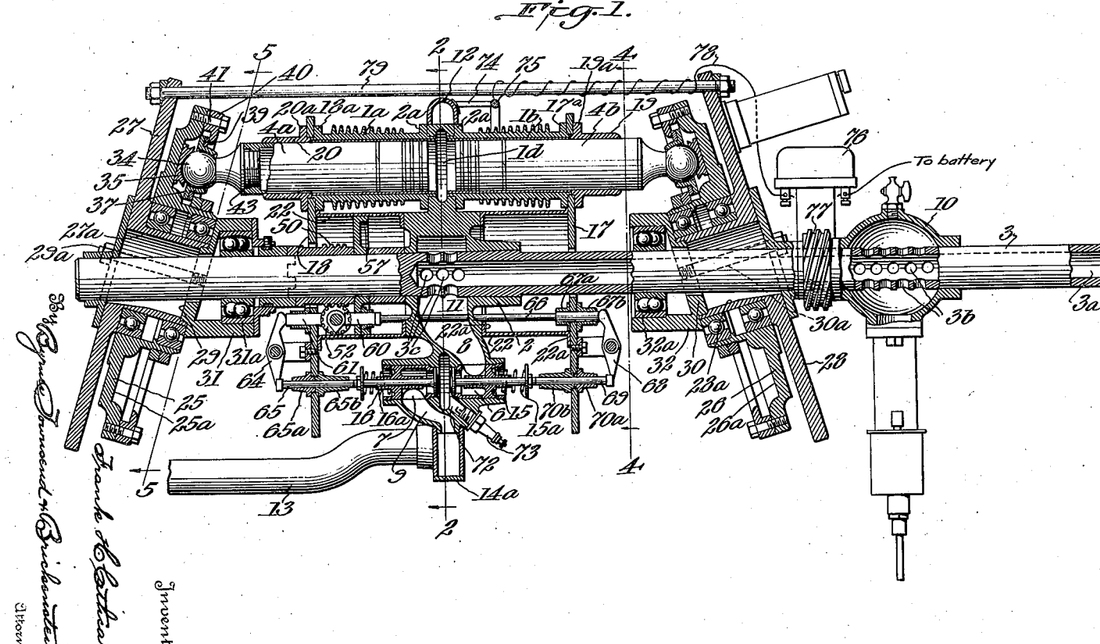
Fig. 1 is a central longitudinal section through a motor unit embodying the invention.

In the drawings the numeral 2 indicates a rotor member secured to shaft 3 and carrying five cylinders which are spaced 72 degrees apart. I preferably form the cylinders as double cylinders as indicated in Fig. 1 where the parts $1^a$ and $1^b$ extend in opposite directions from the central rotor member 2 and in conjunction therewith define one of the cylinders. Each cylinder contains two pistons $4^a$ and $4^b$ respectively moving in opposite directions.

The rotor member 2 is a casting provided with conduits for the passage of gas into and out of the cylinders and with seats into which the cylinders are fitted.

Figure 2:
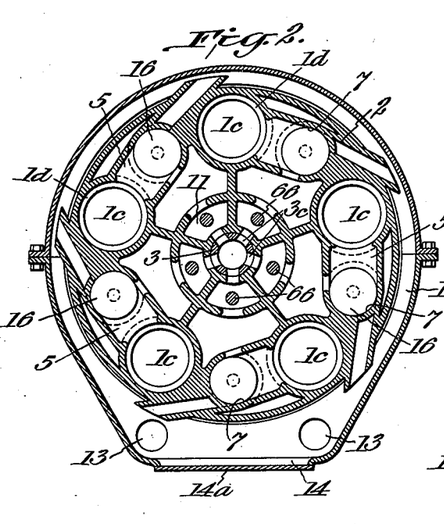
Fig. 2 is a transverse section substantially on line 2—2, Fig. 1.
Figure 3:
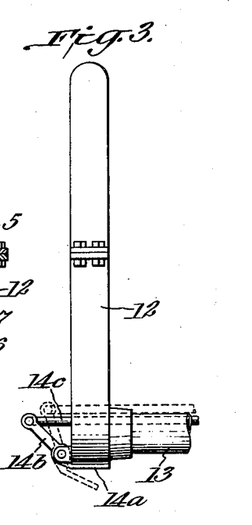
Fig. 3 is an end view of the exhaust manifold as seen in a direction at right angle to Fig. 2.
Figure 4:
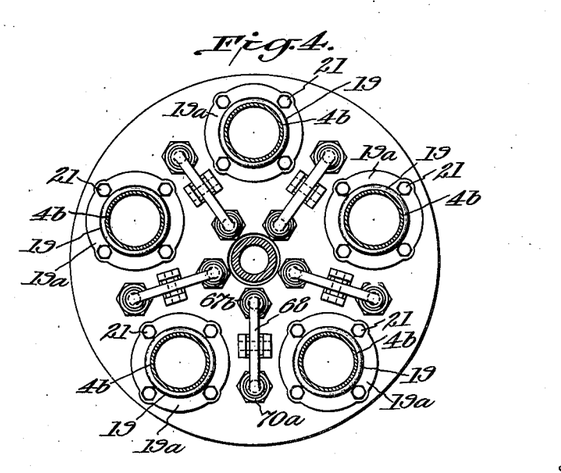
Fig. 4 is a section substantially on line 4—4, Fig. 1.
Figure 5:
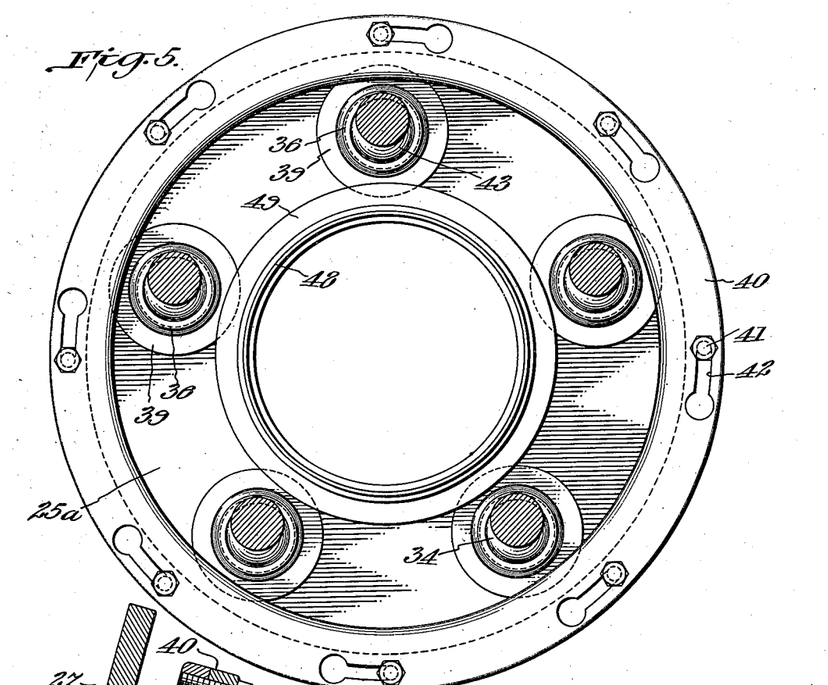
Fig. 5 is a section on line 5—5, Fig. 1.
Figure 6:
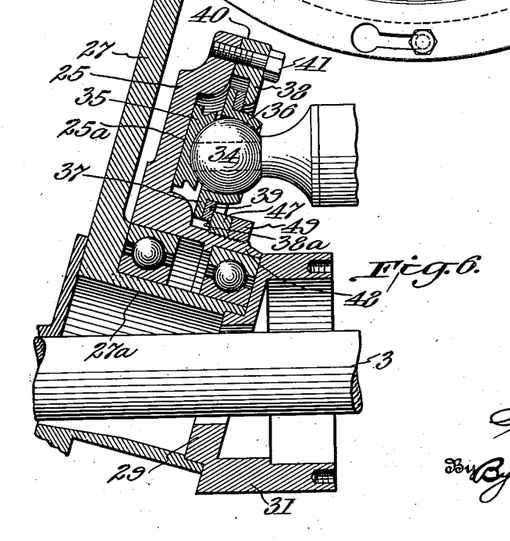
Fig. 6 is a fragmentary sectional view on a larger scale of detail shown in Fig. 1.

As indicated in Figs. 1 and 2, rotor 2 has bores $1^c$ for the reception of the cylinder parts $1^a$ and $1^b$ and recesses $1^d$ defining gas spaces between opposed pistons. Into each recess $1^c$ leads a conduit 5 (Fig. 2) which terminates in valve chambers 6 and 7 which, in turn, are connected with conduits 8 and 9 for the incoming gas and the exhaust gas, respectively.

The shaft 3 has a bore $3^a$ to form a gas passage and openings $3^b$ and $3^c$ through which the gas is admitted into it and discharged from it, respectively. Adjacent the openings $3^b$ the shaft 3 is surrounded by a casing 10 constituting a gas admission chamber. From the openings $3^c$ the gas passes into a collection chamber or manifold 11 from which the conduits 8 branch off to the different valve chambers 6.

The conduits 9 direct the exhaust gas to a circular exhaust manifold 12 from which it can escape through exhaust pipes 13 to a muffler or through a cut-out 14 directly to the atmosphere, as will be explained later on.

The gas admission and the discharge of the exhaust gas are controlled by valves 15 and 16, respectively, which, in the particular instance, are shown as ordinary poppet valves drawn by springs $15^a$ and $16^a$ against their seats.

As will appear later on, the valves 15 and 16 are operated by a special timing mechanism to intermittently admit the gas from the conduits 8 and allow the exhaust gas to flow into the exhaust manifold 12 in cyclic order.

At their outer ends the cylinder parts $1^b$ and $1^a$ are supported in accurately spaced relation by plates 17 and 18. The parts $1^b$ and $1^a$ preferably terminate in flanges $17^a$ and $18^a$ seating against one side of the plates 17 and 18, while on the other side of the plates are disposed extensions 19 and 20 provided with flanges $19^a$ and $20^a$ which bear on the plates 17 and 18 in opposition to flanges $17^a$ and $18^a$. The opposed flanges are rigidly interconnected and drawn up against the plates 17 and 18 by any suitable means.

The inner ends of the cylinder parts $1^a$ and $1^b$ are provided with flanges $2^a$ which bear against the rotor 2 and are firmly secured thereto by screw bolts (not shown).

The rotor, the cylinders and the plates 17 and 18 thus form a rigid mechanical unit secured to and rotating with shaft 3.

Inwardly of the cylinders and concentrically with the shaft 3 are disposed cylindrical casings 22 connected by means of flanges $22^a$ to the rotor 2 and the plates 17, 18, respectively. This casing permits lubrication of the shaft 3 and various mechanism, as will be more fully pointed out, while the cylinders are exposed to the air to be cooled thereby.

The most essential members of the motor are disks 25 and 26 and a special form of mechanism for interconnecting the same with the pistons $4^a$ and $4^b$.

The disks are mounted for rotation about axes inclined to the axis of the shaft 3. In the particular form of apparatus shown, stationary plates 27 and 28 are provided with hubs $27^a$ and $28^a$ on which the disks are mounted by means of ball bearings in any suitable manner.

Into the inner ends of the hubs extend collars 29 and 30 of bearing boxes 31 and 32, respectively, for the shaft 3. The bearing boxes 31 and 32 are rigidly secured to the hubs $27^a$ and $28^a$ by means of long bolts $29^a$ and $30^a$ which are drawn up against plates $27^b$ and $28^b$, bearing against the plates 27 and 28, respectively. The hubs define a central opening large enough to accommodate the shaft 3 passing obliquely through them and at the sides between the top and the bottom of the collars 29 and 30 there is sufficient room for the bolts $29^a$ and $30^a$ to pass between the hubs and the shaft 3. The bearings $31^a$ and $32^a$ are thus rigidly supported from the stationary frames of which the plates 27 and 28 are parts.

As previously stated arrangements including a rotary cylinder frame and a disk or disks mounted for rotation about an axis inclined to the axis of rotation of the cylinder frame are not new. The radically new feature characterizing my invention, however, is the particular form of connection between the pistons of the cylinders and the disks. While the construction disclosed is not to be understood as representing the only feasible execution of the idea on which the invention is based, it is what I at present consider as a preferred embodiment and as such affords a clear understanding of the broad principles of operation, and a fairly definite perception of all equivalents coming under consideration.

The disks 25 and 26 are constructed to define substantially circular slide ways. These slide ways include principally smooth circular surfaces $25^a$ and $26^a$ on the disks 25 and 26, in contact with which are directly or indirectly kept the outer ends of the pistons $4^a$ and $4^b$. As shown, each piston end may carry a ball 34 bearing on a slide piece 35 provided in one face with a spherical concavity receiving the ball, the opposite face being accurately machined to provide a smooth sliding surface. The ball is held against movement away from the slide piece 35 or generally away from the slide surface $25^a$ or $26^a$ by means of a retaining element comprising a partly spherical shell 36 terminating in a circular flange 37. The flange 37 bears against circular overhanging shoulders 38 and $38^a$ forming part of the disk, through an interposed washer or ring 39 of fiber or like wearing material. The combined thickness of the flange 37 and washer 39 is so chosen that shell 36 in engagement with the ball maintains the latter in contact with the surface of the concavity, and the slide piece 35 in contact with the slide surface $25^a$ or $26^a$.

For practical reasons I provide the shoulder 38 on a separate ring 40 which may be attached to the disk by means of bolts 41. As a matter of expedience I provide the ring 40 with bayonet slots 42 whereby the ring may be detached without entirely unscrewing the bolts. To remove the ring, it is only necessary to slightly unscrew the bolts and turn the ring until the enlargements of the slots are in alignment with the bolt heads, whereupon the ring may be slipped over the latter. The shoulder $38^a$ is defined by a collar 47 which is screwed upon the hub 48 of the disk and secured thereon by a lock nut 49.

The ball 34 is preferably formed on a separate element having a screw-threaded plug 43 (Fig. 1) by means of which it may be screwed into the piston.

Figure 10:
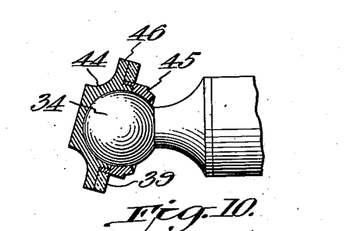
Fig. 10 is a fragmentary sectional view showing a modification of a detail shown in Fig. 6.

In Fig. 10 is shown a slight modification of the connection. A slide piece 44 and a shell 45 are screwed upon each other, the flange 46 being provided on the slide piece 44.

Figure 7:
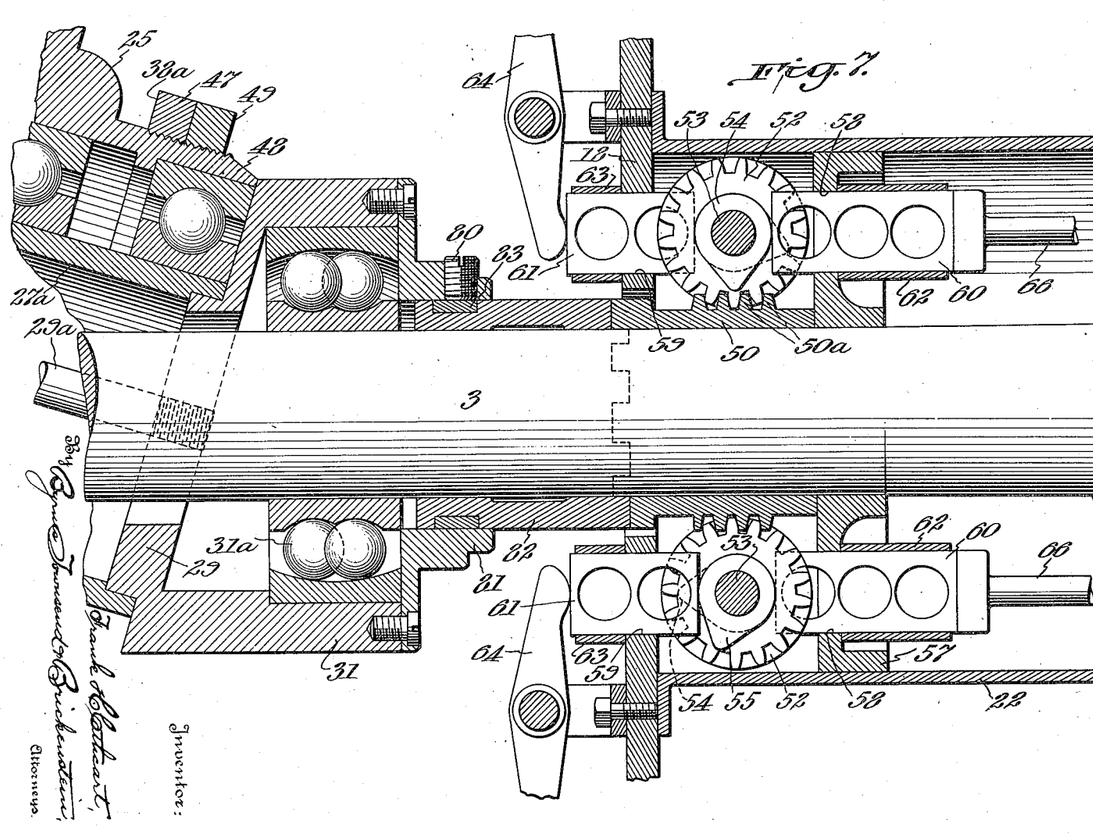
Fig. 7 is a fragmentary longitudinal section on line 7—7, Fig. 9, showing on an enlarged scale detail disclosed in Fig. 1.
Figure 8:
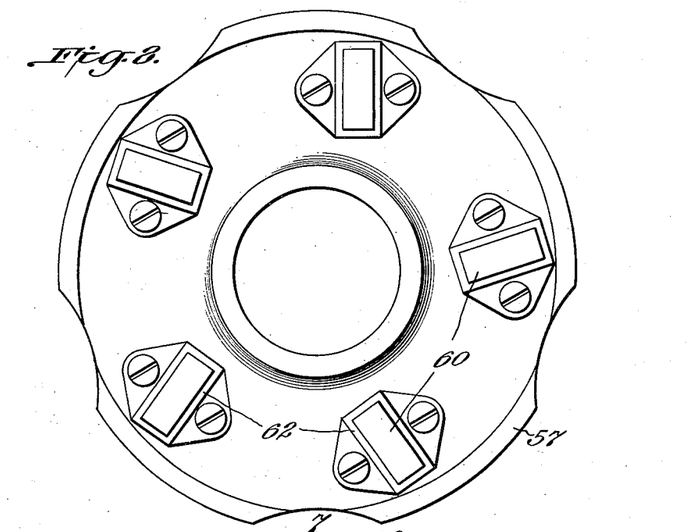
Fig. 8 is one end view.
Figure 9:
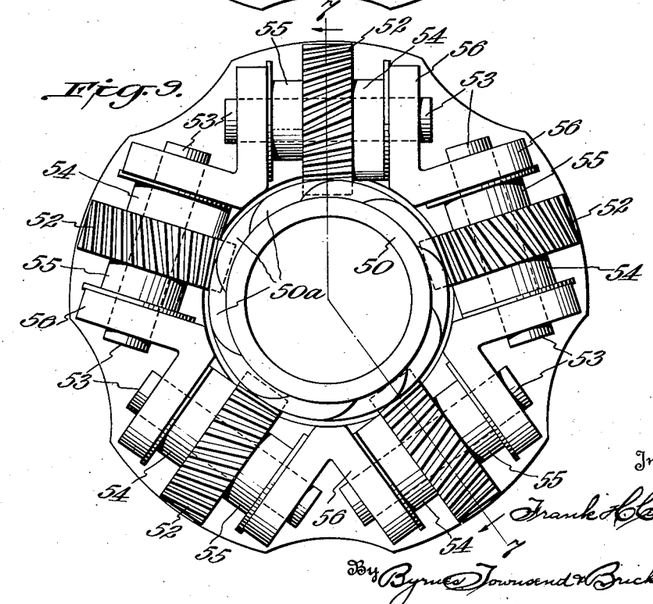
Fig. 9 is an opposite end view of timing gear mechanism for operating the admission and exhaust valves.

The valves are operated by a timing mechanism shown on an enlarged scale in Figs. 7, 8 and 9. Upon the shaft 3 is loosely mounted a tubular element 50 having a worm $50^a$, which is held stationary through a connection with a part of the stationary frame. The worm 50ª is in mesh with five pinions 52 spaced 72 degrees apart. Each pinion is mounted on a shaft 53 and is secured thereto together with cams 54 and 55. The shafts 53 are mounted in V-shaped bearing members 56, the arms of which include angles of about 72 degrees to fill the angular spaces between adjacent pinions. Once the shafts are in position in the bearing members, they are all interlocked against separation under working conditions.

The worm 50ª is disposed adjacent to plate 18 within the rotor system and the inward motion of the tubular member 50 is limited by a disk member 57 mounted on the shaft 3 and bearing against the cylindrical casing 22. This disk member and the plate 18 are provided with openings 58 and 59, respectively, in which are movably disposed bars 60 and 61. To afford a larger guiding surface for the blocks, the disk member 57 and the plate 18 are provided with sleeves 62 and 63. The bars 60 and 61 are in alignment with the cams 55 and 54, respectively.

On the outer surface of the plate 18 are mounted rocker arms 64, one end of which bears upon bars 61, while the other end bears upon rods 65 movably mounted in bushings 65ª and 65ᵇ on opposite sides of plate 18.

Rods 65 in turn are in alignment with and bear upon the stems of the exhaust valves 16.

To the bars 60 are attached rods 66 which extend through the gas space 11 and through plate 17 guided by bushings 67ª and 67ᵇ. On the outer side of plate 17 are mounted rocker arms 68, one end of which bears upon the ends of rods 66, while the other end bears upon rods 69 extending through the plate 17 and bushings 70ª and 70ᵇ, the rods 69 in turn being in alignment with and bearing upon the stems of the admission valves 15.

The rotor frame 2 is provided with bores 72 leading into the gas spaces between opposite pistons and into the bores 72 extend spark plugs 73.

On the exhaust manifold 12 is supported by means of insulator studs 74 an arcuate conductor 75 which is energized by a timing mechanism of usual type 76, the timing mechanism being driven from a worm 77 on shaft 3. The current is conducted from a battery (not shown) to the timing mechanism and from the timing mechanism by a conductor 78 to the arcuate conductor 75. The conductor is advantageously supported on a tie rod 79 interconnecting the stationary plates 27 and 28.

The operation is as follows:

The timing mechanism for the control of the gas flow is so adjusted that the valves 15 are moved to open position at the proper time during the suction stroke of each piston and that the valves 16 are opened at the beginning of the exhaust stroke of each piston. The gas is thus sucked into the conduits 5, the gas spaces 2ª and the opposing cylinders 1ª and 1ᵇ, and then compressed in the usual way during the compression stroke.

The timing device 76 is set to ignite the compressed mixture at the desired moment. The current jumps from the arcuate conductor 75 to the lead-in wire of the spark plug. The distance between the arcuate conductor and the spark plug may be so chosen as to define a gap most suitable for particular conditions. The length of the arcuate conductor is determined by the usual range of the spark adjustment, as will be readily understood.

The gear ratio of the worm 50ª and the pinions 52 is 1:2, i. e. during one revolution of the pinions 52 as a unit about the axis of shaft 3 in engagement with the stationary worm the pinions make half a revolution about their axes of rotation and during two revolutions about the axis of shaft 3 they make one complete revolution about their own axes of rotation. This is in accordance with the well known principles of operation of the four cycle type engine. One cycle is completed during two revolutions of the rotor. The admission valves and the exhaust valves are operated once during two revolutions in the required cyclic order. The cams 55 transmit motion to the admission valves 15 through the rods 66, rocker arms 68 and rods 69, while the cams 54 transmit motion to the exhaust valves through the rocker arms 64 and the rods 65. The springs 15ª and 16ª operate to normally close the valves and hold them in closed position while the rocker arms open the valves against the tension of the springs.

To permit an adjustment of the timing mechanism to change the time relation of the valve movement, I have provided set screw 80 on the stationary member 81, which in the particular instance is the end plate for the bearing 31ª, for adjustably holding the tubular member 50 in any desired angular relation, preferably through an intermediate tubular member 82 connected to the tubular member 50 by means of a clutch connection as indicated in dotted lines in Figs. 1 and 7. The set screw 81 impinges upon a split steel ring 83 so that mutilation of the tubular member 82 is avoided. To change the time relation of the valves it is only necessary to loosen the set screw, turn the tubular member to the desired extent and draw up the set screw again.

While ordinarily the exhaust gases are passed through pipes 13 to a muffler, I have provided a cut-out 14 including a plate 14ª hinged on the exhaust manifold and operable by means of a link 14ᵇ and a rod 14ᶜ which may be actuated in the usual way.

As previously stated, the pistons 4ª and 4ᵇ are maintained in contact with the disks 25 and 26 respectively against movement away from the disks. However, they are absolutely free to rotate about the axis of shaft 3 independently of the disks 25 and 26. In fact the disks may be held stationary without essentially affecting the principle of operation of the motor as a whole. The disks 25 and 26 are in reality abutment plates defining inclined planes. Each impulse given to a piston by the expansive force of the gases is transmitted to the disks and translated into rotary movement of the rotor frame due to the reaction of the inclined plane upon the pistons. The pistons virtually slide down the inclined plane in accordance with fundamental principles of physics. If the disks are held stationary, the ends of the pistons actually slide down the inclined plane of the disks to the end of the expansion stroke. Such an actual sliding movement, however, would incur considerable friction losses. In reality, so far as the reaction of the disks upon the pistons is concerned, it is immaterial whether the disks are stationary or rotate, since the inclined plane is fixed in space and in relation to the disks. A concurrent movement of the disks with the pistons has therefore no significance over a stationary position other than that it eliminates objectionable friction and to that extent increases the efficiency of the engine.

If we dealt only with the expansion stroke the rotary movement of the disks 25 and 26 would probably be strictly synchronous with the rotary movement of the rotor inasmuch as the resistance of sliding friction between the pistons and the disks 25 and 26 is very large in proportion to the roller bearing friction. However, the disk is not only subjected to the driving action resulting from the friction but also has to do work. During one quarter of a cycle it has to push the piston back against the force due to the pressure of the exhaust gases. During another quarter of a cycle it has to pull out the piston to suck in the gas, and during another quarter of a cycle it has to compress the gas, and in all of these instances it must also overcome piston friction. Due to the action of the various retarding forces upon the disk the latter in the particular instance where the angle of inclination of the disks is about 17½ degrees, is caused to lag behind synchronous speed an amount which I have found to be about 3/8" during one revolution.

This retardation or creeping in backward direction is also at least in part due to the following:

Since the projection of the circle in which the pistons move, upon the disks 25 and 26 defines ellipses, the peripheral velocity of the disk must vary if its angular velocity is the same as that of the rotor frame. Since the velocity, either angular or peripheral, must at any moment be the same for all five pistons, and since for a definite angular velocity of the disk at the same moment the peripheral velocity measured along the elliptical path being variable, can inherently not agree with that of some of the pistons, there must be during each revolution a relative motion between the slide piece 35 of each piston and the slide surfaces 25ª and 26ª respectively. During each revolution of the shaft 3 some of the pistons are driven outwardly on their explosion stroke, and during such stroke each piston tends to take the disk along, while other pistons at the same time are acted upon by the disk. The result therefore is that the inevitable relative motion between the individual pistons and the disks takes place probably while the latter are acted upon by the disks. I have not made special investigations as to the correctness of my assumptions, but I do know as a fact that there is an actual slippage amounting to about 3/8" during each revolution in a machine actually built according to the principles of the invention.

Due to the eccentricity of the elliptical path, which varies with the angle of inclination of the disks 25 and 26, there must also be a relative motion between the slide pieces 35 and the slide surfaces 25ª and 26ª in radial direction and such relative motion must of course be equal to the amount of eccentricity or the difference between the long radius of the ellipse and the short radius thereof.

Heretofore efforts have been made to take care of relative movement between the individual pistons and the disks by pivotal connections, and also by affording relative sliding motion in radial direction.

The arrangement herein described differs essentially from all such connections in that each piston is entirely free and independent of the disks so far as the range of relative motion requires a mutual adjustment, and is absolutely free to assume that relative position which it tends to assume at each instant.

There is, above all, no strain between the pistons and the disks due to the variation of the velocity inherent in the elliptical path described by the ends of the pistons upon the disks. This is particularly of advantage when the engine works with 3, 5 or 6 cylinders. For instance, in the case of five cylinders, the power strokes begin at angular intervals of 144 degrees. Thus one stroke has not yet reached its end when another stroke is superimposed upon the disk. Two pistons are therefore all the time acting upon the disk while, as previously explained, the velocity of points of the disk measured along the elliptical path referred to must vary. When, for instance, one piston just starts on its explosion stroke, and the previously propelled piston is 144 degrees in advance of it, the latter must have the peripheral velocity of the other piston, since both are part of the same revolving body (rotor), whereas the peripheral velocity of the point at which the previously propelled piston bears on the disk must inherently have a smaller peripheral velocity, being 144 degrees from the point at which the peripheral velocity is a maximum. Positive connections between the disks and the pistons which do not allow for relative angular motion along the elliptical path under such conditions of operation would result in an inoperative device.

The engine is singularly free from noise and vibration, due principally to the freedom of relative motion in angular as well as radial direction between the pistons and the disks 25 and 26.

Due to absence of piston rods undergoing pivotal movement relatively to the piston, the pistons may be given a maximum bearing surface, while the length of the motor unit may be a minimum.

While the invention is specific in character, various changes may be made within the scope of the disclosure.

Compensation for wear such as is bound to occur between the disks 25 and 26, on the one hand, and the parts connecting the pistons to them, on the other hand, may be easily made by interposing shims between the flanges 37 and the washers 39.

Due to the precessional movement of the disk the wear incident to the interconnection of the pistons and the disks is uniformly distributed over the whole area of the slide way, i. e. over the slide surfaces 25ª and 26ª as well as the overhanging shoulders. Aside from the uniformity of wear there is the advantage that compensation for wear is necessary only after longer periods of operation.

The pistons are free to angularly move above their own axis in the cylinders and actually change their angular positions with the result that they wear uniformly in the cylinders.

The firing order of the cylinders is 1, 3, 5, 2, 4, i. e. ignition takes place at angular intervals of 144 degrees as previously suggested.

In the foregoing I have described one embodiment of the invention. There is obviously considerable latitude in respect to the details available for the execution of the invention.

I claim:—

1. A rotary engine comprising a plurality of parallel cylinders grouped about and connected to a revolubly mounted shaft, reciprocating pistons in the cylinders, a disk mounted for rotation about an axis inclined to the shaft, and means interconnecting the said pistons and disk to prevent relative movement in axial direction while permitting unrestrained relative angular movement of the disk and the pistons about their respective axes of rotation.

2. A rotary engine comprising a plurality of parallel cylinders grouped about and connected to a revolubly mounted shaft, reciprocating pistons in the cylinders, a disk mounted for rotation about an axis inclined to the shaft, and means interconnecting the said pistons and disk to prevent relative movement in axial direction while permitting universal motion of the ends of the pistons in the plane of the disk and unrestrained relative angular movement of the disk and the pistons about their respective axes of rotation.

3. A rotary engine comprising a plurality of parallel cylinders grouped about and connected to a revolubly mounted shaft, reciprocating pistons in the cylinders, a disk mounted for rotation about an axis inclined to the shaft, and a connection between the end of each piston and the disk permitting unrestrained motion of the piston ends in all directions of the plane of the disk independently of the angular position of the disk about its axis of rotation while preventing relative movement of the pistons and the disk in axial direction.

4. A rotary engine comprising a plurality of parallel cylinders grouped about and connected to a revolubly mounted shaft, reciprocating pistons in the cylinders, a disk mounted for rotation about an axis inclined to the shaft and means for connecting the pistons to the disk, said means including a ball and socket connection and a circular slide way on the disk permitting a limited radial movement of one of the elements of the connecting means in the plane of the disk and unrestrained movement thereof in the circular course of the slide way.

5. In a rotary engine of the type described, a power shaft, a disk mounted for rotation about an axis inclined to the shaft, a circular slide way on the disk, having overhanging shoulders and a slide piece in the slide way having a retaining flange of a width smaller than the width of the slide way.

6. In a rotary engine of the type described, a power shaft, a disk mounted for rotation about an axis inclined to the shaft, a circular slide way having overhanging shoulders, and a slide piece having means for confining it in the slide way, the slide piece being movable transversely of the slide way.

7. In a rotary engine of the type described, a disk and two rings detachably connected to the disks, said rings defining concentric shoulders overhanging the disks and facing each other, thereby constituting a circular slide way on the disk.

8. In a rotary engine of the type described, a disk and two rings detachably connected to the disks, said rings defining concentric shoulders overhanging the disk and facing each other, the outer of said rings being connected to the disk by means of bolts and bayonet slots.

9. In a rotary engine of the class described, a disk having a central hub, a ring on the hub defining a circular shoulder toward the face of the disk, a ring detachably mounted adjacent the periphery of the disk and having an inwardly extending flange concentric with the ring on the hub, said flange cooperating with the ring on the hub to define a circular slide way on the disk.

In testimony whereof, I affix my signature.

FRANK H. CATHCART.